United States Patent
Miyata

(10) Patent No.: US 9,137,406 B2
(45) Date of Patent: Sep. 15, 2015

(54) INFORMATION PROCESSING APPARATUS, METHOD, AND COMPUTER-READABLE MEDIUM STORING A PROGRAM, FOR SHIFTING DIFFERENT POWER STATES

(71) Applicant: CANON KABUSHIKI KAISHA, Tokyo (JP)

(72) Inventor: Takaaki Miyata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/903,859

(22) Filed: May 28, 2013

(65) Prior Publication Data

US 2013/0321851 A1     Dec. 5, 2013

(30) Foreign Application Priority Data

May 30, 2012   (JP) ................................. 2012-122906

(51) Int. Cl.
    *G06F 15/00*    (2006.01)
    *H04N 1/00*     (2006.01)
    *G06F 9/44*     (2006.01)

(52) U.S. Cl.
    CPC .......... *H04N 1/00896* (2013.01); *G06F 9/4418* (2013.01); *H04N 1/00925* (2013.01); *H04N 2201/0081* (2013.01); *H04N 2201/0082* (2013.01); *H04N 2201/0093* (2013.01); *H04N 2201/0094* (2013.01); *Y02B 60/186* (2013.01)

(58) Field of Classification Search
    USPC ................................. 358/1.1–1.16
    See application file for complete search history.

(56) References Cited

U.S. PATENT DOCUMENTS

2002/0147873 A1* 10/2002 Kwon et al. .................. 710/200
2005/0097374 A1* 5/2005 Aharonian et al. ........... 713/300
2009/0094468 A1* 4/2009 Larson .......................... 713/310
2011/0102838 A1* 5/2011 Watanabe .................... 358/1.15

FOREIGN PATENT DOCUMENTS

| CN | 102053806 A | 5/2011 |
| EP | 2 059 012 A1 | 5/2009 |
| JP | 2005-284491 A | 10/2005 |

OTHER PUBLICATIONS

Beloglazov, Anton, Rajkumar Buyya, Young Choon Lee, and Albert Y. Zomaya. "A Taxonomy and Survey of Energy-Efficient Data Centers and Cloud Computing Systems." Advances in Computers 82 (2011): 1-49.

Boegeholz, Harald. "Jack-in-the-box. Neues Power Management in Windows 98." c't—Magazin fur Computertechnik 15 (1999): 96-99.

* cited by examiner

*Primary Examiner* — Benny Q Tieu
*Assistant Examiner* — Michael Y Tzeng
(74) *Attorney, Agent, or Firm* — Canon U.S.A., Inc. IP Division

(57) ABSTRACT

The present invention is directed to an information processing apparatus operable in any of a plurality of power states including a first power state and a second power state in which power consumption is lower than power consumption in the first power state. The information processing apparatus includes a reception unit configured to receive a shift instruction to shift to the second power state, and a control unit configured to shift the information processing apparatus to the second power state in a case where the reception unit receives the shift instruction while an application that does not support the second power state is not running, and not to shift the information processing apparatus to the second power state in a case where the reception unit receives the instruction while an application that does not support the second power state is running.

9 Claims, 6 Drawing Sheets

INFORMATION PROCESSING APPARATUS, METHOD, AND COMPUTER-READABLE MEDIUM STORING A PROGRAM, FOR SHIFTING DIFFERENT POWER STATES

BACKGROUND OF THE INVENTION

1. Field of the Invention

The present invention relates to an information processing apparatus, a control method for the information processing apparatus, and a program.

2. Description of the Related Art

In recent years, the starting time of an information processing apparatus has become longer and longer due to an increase in programs. Under such a circumstance, many information processing apparatuses employ a suspending function to shorten the starting time. The suspending function is a technique for increasing the speed of booting at the time of recovery from a power-saving mode by continuing the supply of power to a memory during the power-saving mode to maintain data (i.e., a suspended state) (Japanese Patent Application Laid-Open No. 2005-284491).

However, when suspending processing is executed by an information processing apparatus in which an application that does not support the suspending function is running, malfunction may occur at the time of resuming. For example, in a case where the application is for execution of user authentication, user authentication may not be executed at the time of resuming. In a case where the application is for execution of communication, communication may not be executed at the time of resuming or may be executed but at a low communication speed. In a case where the application is for displaying an image on an image display apparatus, no image may be displayed on the image apparatus at the time of resuming. These malfunctions occur because a registered state of hardware at the time of suspending cannot be recovered normally at the time of resuming.

SUMMARY OF THE INVENTION

The present invention is directed to a technique for preventing malfunction at the time of resuming an information processing apparatus in a case where an instruction to shift to a suspended state is given to the information processing apparatus in which an application that does not support the suspending function is running.

According to an aspect of the present invention, an information processing apparatus operable in any of a plurality of power states including a first power state and a second power state in which power consumption is lower than power consumption in the first power state. The information processing apparatus includes a reception unit configured to receive a shift instruction to shift to the second power state, and a control unit configured to shift the information processing apparatus to the second power state in a case where the reception unit receives the shift instruction while an application that does not support the second power state is not running, and not to shift the information processing apparatus to the second power state in a case where the reception unit receives the instruction while an application that does not support the second power state is running.

Further features of the present invention will become apparent from the following description of exemplary embodiments with reference to the attached drawings.

DESCRIPTION OF THE EMBODIMENTS

Although an apparatus that has a scanner function, a printer function, and a facsimile (FAX) function is described below as an image forming apparatus such as a printer according to an exemplary embodiment of the present invention, the present invention is not limited to this configuration. For example, the present invention is applicable to an apparatus having at least one or more of a scanner function, a printer function, and a FAX function. Further, the present invention is also applicable to a general information processing apparatus such as a personal computer (PC) that does not have any of a scanner function, a printer function, and a FAX function.

Figure 1:
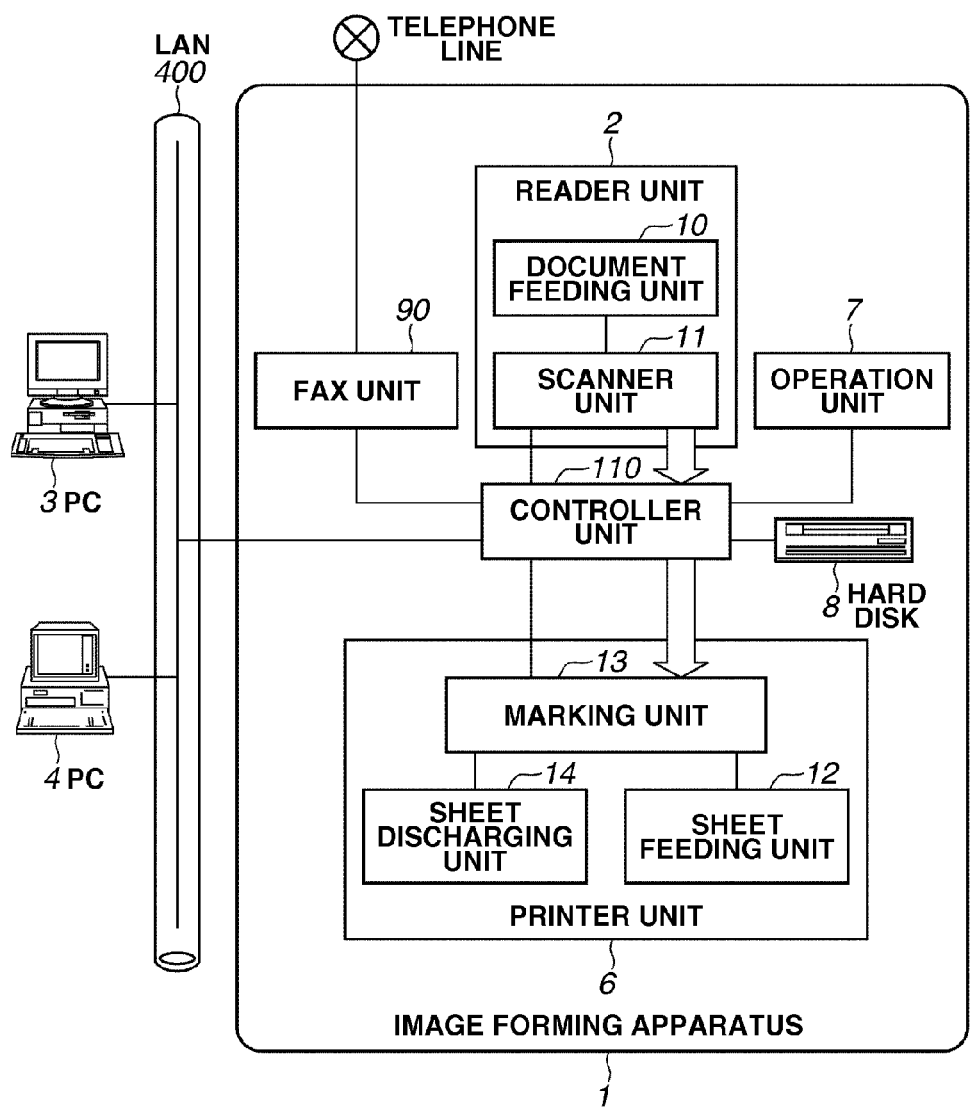
FIG. 1 is a block diagram illustrating a configuration of an image forming apparatus.

FIG. 1 is a block diagram illustrating a configuration of an image forming apparatus according to a first exemplary embodiment.

An image forming apparatus 1 is connected to PCs 3 and 4 via a local area network (LAN) 400.

The image forming apparatus 1 includes a reader unit 2, a printer unit 6, an operation unit 7, a hard disk 8, a FAX unit 90, and a controller unit 110.

The reader unit 2 reads a document to input image data. The reader unit 2 includes a document feeding unit 10 and a scanner unit 11. The document feeding unit 10 conveys a document. The scanner unit 11 optically reads the conveyed document to convert the document into image data in the form of electric signals.

The printer unit 6 executes printing on a recording sheet based on the image data. The printer unit 6 includes a sheet feeding unit 12, a marking unit 13, and a sheet discharging unit 14. The sheet feeding unit 12 includes a plurality of sheet cassettes for storing recording sheets. The marking unit 13 transfers and fixes the image data onto the recording sheet. The sheet discharging unit 14 executes sorting processing and stapling processing with respect to the printed recording sheet and then discharges the printed recording sheet to the outside.

The operation unit 7 receives various user instructions via keys. The operation unit 7 also notifies a user of various types of information via a panel.

The hard disk 8 stores control programs and image data pieces.

The FAX unit 90 executes facsimile input/output processing.

The controller unit 110 is connected to components such as the reader unit 2, the printer unit 6, the operation unit 7, the hard disk 8, and the FAX unit 90 to control the components.

Figure 2:
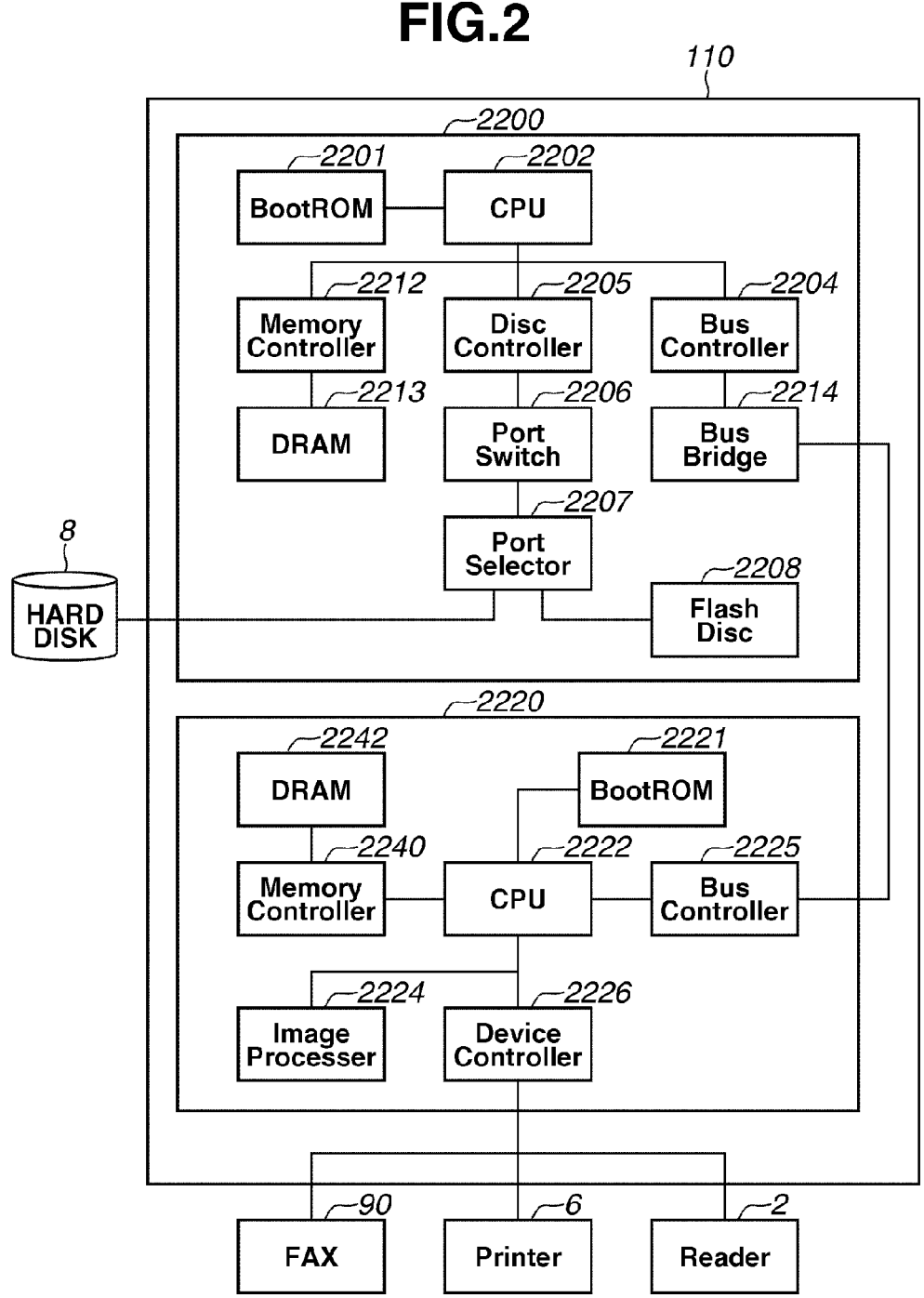
FIG. 2 is a block diagram illustrating a configuration of a controller unit.

FIG. 2 is a block diagram illustrating a configuration of the controller unit 110

The controller unit 110 mainly includes a main board 2200 and a sub-board 2220. The main board 2200 handles general information processing. The sub-board 2220 handles image formation processing. The main board 2200 and the sub-board 2220 may be formed as a single board.

The main board 2200 includes a boot read only memory (ROM) 2201, a central processing unit (CPU) 2202, a bus controller 2204, a disk controller 2205, a port switch 2206, a port selector 2207, and a flash disk 2208. The main board 2200 also includes a memory controller 2212, a dynamic random access memory (DRAM) 2213, and a bus bridge 2214.

The boot ROM 2201 is a nonvolatile storage medium and stores boot programs and the like.

The CPU 2202 executes a boot program, an operating system (OS), an application program, and so on.

The bus controller 2204 controls transmission and reception of data between the main board 2200 and the sub-board 2220.

The disk controller 2205 controls the hard disk 8 via the port switch 2206 and the port selector 2207.

The port switch 2206 receives a command from the CPU 2202 to switch ON/OFF of access via the port selector 2207.

The port selector 2207 connects the flash disk 2208 and the hard disk 8 together and selects which one of the flash disk 2208 and the hard disk 8 is to be accessed.

The flash disk 2208 is a nonvolatile storage medium and stores an OS, an application program, and so on.

The memory controller 2212 controls the DRAM 2213.

The DRAM 2213 is a volatile storage medium and temporarily stores a program, image data, and the like which are used by the CPU 2202.

The bus bridge 2214 relays data between the bus controller 2204 and a bus controller 2225.

The sub-board 2220 includes a boot ROM 2221, a CPU 2222, a DRAM 2242, and a memory controller 2240.

The boot ROM 2221 is a nonvolatile storage medium and stores a boot program and so on.

The CPU 2222 executes a boot program, an OS, an application program, and so on.

The memory controller 2240 controls the DRAM 2242.

The DRAM 2242 is a volatile storage medium and temporarily stores a program, image data, and the like which are used by the CPU 2222.

An image processor 2224 executes various types of image processing with respect to image data.

The bus controller 2225 controls transmission and reception of data between the main board 2200 and the sub-board 2220.

A device controller 2226 controls the reader unit 2, the printer unit 6, and the FAX unit 90.

The operation unit 7 is connected to the CPU 2202 via a bus, which is not illustrated.

The controller unit 110 includes a network interface controller (NIC), which is not illustrated, in the main board 2200 or in the sub-board 2220 to be communicable with the PC3 and the PC4 via the LAN 400.

Figure 3:
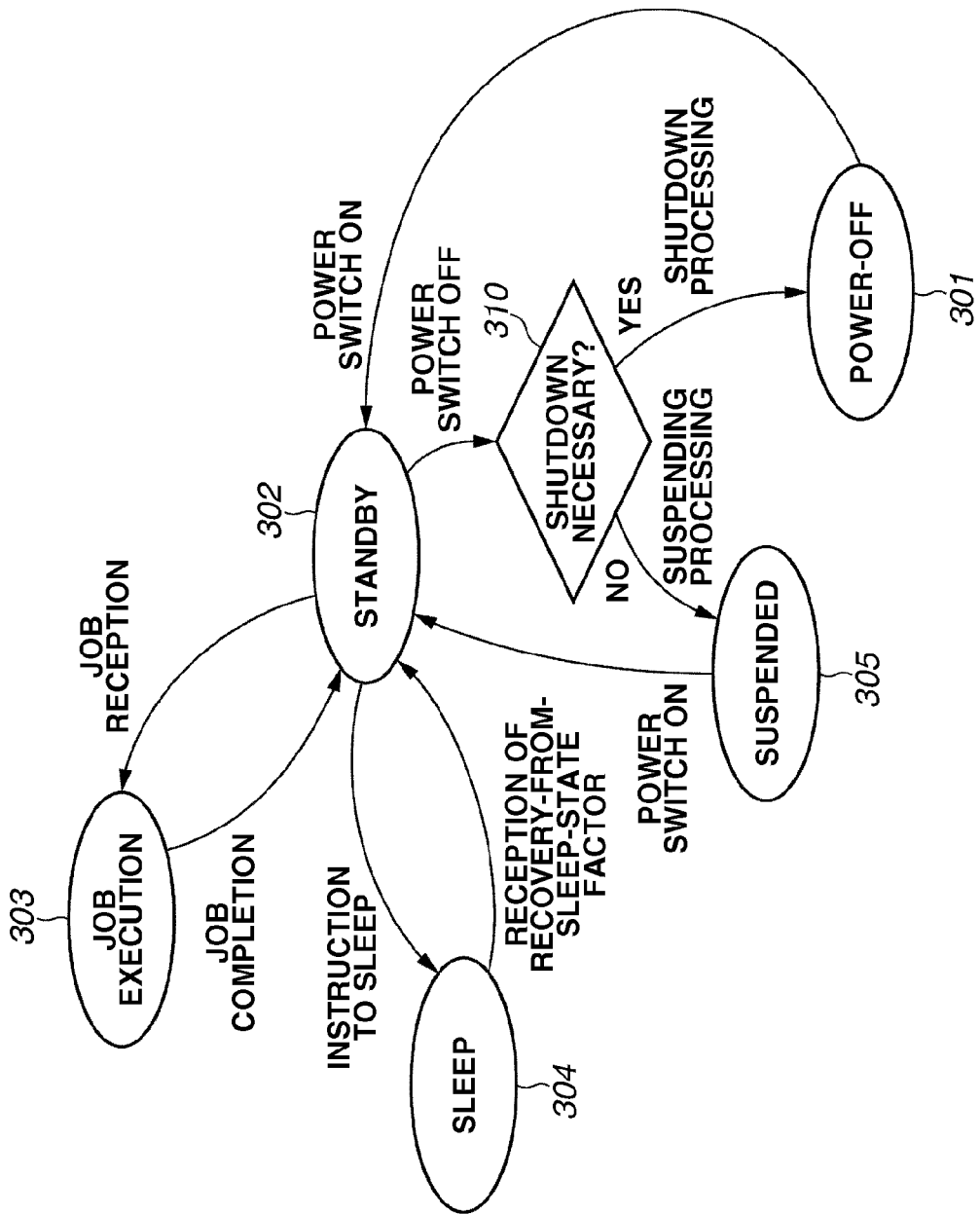
FIG. 3 is a state transition diagram illustrating power states of the image forming apparatus.

FIG. 3 is a state transition diagram illustrating transitions of power states of the image forming apparatus 1.

The image forming apparatus 1 is operable in any of these power states.

The power states of the image forming apparatus 1 include a power-off state 301, a standby state 302, a job execution state 303, a sleep state 304, and a suspended state 305.

The power states in descending order of power consumption are as follows: the job execution state 303>the standby state 302>the sleep state 304>the suspended state 305>the power-off state 301.

The power-off state 301 refers to a state in which a power source of the image forming apparatus 1 is turned OFF. Thus, in the power-off state 301, the supply of power to every component of the image forming apparatus 1 is stopped.

When a user turns on a power switch in the power-off state 301, the image forming apparatus 1 is shifted to the standby state 302.

The standby state 302 (an example of a first power state) refers to a state in which the image forming apparatus 1 is waiting for job execution. In the standby state 302, power is supplied to every component of the image forming apparatus 1. In the standby state 302, however, it is not necessary to supply power to every component of the image forming apparatus 1. Power may be supplied only to essential components but not to the rest of the components (e.g., operation unit 7). When the image forming apparatus 1 in the standby state 302 receives a job from the PC 3, the image forming apparatus 1 is shifted to the job execution state 303. When the image forming apparatus 1 in the standby state 302 receives an instruction to sleep, the image forming apparatus 1 is shifted to the sleep state 304. The instruction to sleep corresponds to pressing of a shift-to-sleep-state button by a user or passing of a predetermined period of time in the standby state 302.

When a user turns off the power switch in the standby state 302, the necessity of a shutdown is determined in step 310. If a shutdown is necessary, then shutdown processing is executed to shift the image forming apparatus 1 to the power-off state 301. If a shutdown is not necessary, then suspending processing is executed to shift the image forming apparatus 1 to the suspended state 305. The shutdown processing refers to processing in which the OS and the application are terminated to terminate the image forming apparatus 1. The suspending processing refers to processing in which the state of the image forming apparatus 1 is stored in the DRAM 2213 and then the image forming apparatus 1 is paused. The suspended state 305 refers to a state in which the image forming apparatus 1 is paused and the supply of power to the DRAM 2213 is continued to maintain the state of the image forming apparatus 1 stored in the DRAM 2213.

In place of the suspending processing, hibernation processing may be employed. The hibernation processing refers to processing in which the state of the image forming apparatus 1 is stored in the hard disk 8 and then the image forming apparatus 1 is paused. The hibernation state refers to a state in which the image forming apparatus 1 is paused and the supply of power to the hard disk 8 is stopped. In the hibernation state, although the supply of power to the hard disk 8 is stopped, since the hard disk 8 is a nonvolatile storage medium, the state of the image forming apparatus 1 stored in the hard disk 8 can be maintained. Determination of the necessity of a shutdown will be described below.

Not only the DRAM 2213 but also the DRAM 2242 may be included in targets of suspension (or hibernation). In addition, only the DRAM 2213 may be included in the target of suspension (or hibernation), and data stored in the DRAM 2242 may be stored in the DRAM 2213 at the time of suspension (or hibernation).

The job execution state 303 refers to a state in which the image forming apparatus 1 is executing a job and power is supplied to every component of the image forming apparatus 1. In the job execution state 303, however, it is not necessary to supply power to every component of the image forming apparatus 1. Power may be supplied only to essential components but not to the rest of the components (e.g., operation unit 7). When the image forming apparatus 1 in the job execution state 303 completes the job, the image forming apparatus 1 is shifted to the standby state 302.

The sleep state 304 refers to a state in which the image forming apparatus 1 is standing by under a power saving condition. In the sleep state 304, while power is supplied to the controller unit 110 among the components of the image forming apparatus 1, the supply of power to the reader unit 2, the printer unit 6, the operation unit 7, and the like is stopped. When the image forming apparatus 1 in the sleep state 304 receives a recovery-from-sleep-state factor, the image forming apparatus 1 is shifted to the standby state 302. The recovery-from-sleep-state factor corresponds to pressing of a recovery-from-sleep-state button by a user or job reception from the PC 3. A deep sleep state, which is not illustrated, may also be included in the power states of the image forming apparatus 1. The deep sleep state refers to a state in which predetermined conditions are satisfied in the sleep state 304. The deep sleep state is different from the sleep state 304 in components of the controller unit 110 to which power is supplied. For example, the supply of power to the sub-board 2220 is stopped in the deep sleep state.

The suspended state 305 (an example of a second power state) refers to a state in which the image forming apparatus 1 is standing by to be bootable at high speed. In the suspended state 305, power is supplied to the DRAM 2213 among the components of the image forming apparatus 1, and the supply of power to the rest of the components is stopped. When a user turns on the power switch in the suspended state 305, resuming processing is executed to shift the image forming apparatus 1 to the standby state 302. The resuming processing refers to processing in which the state of the image forming apparatus 1 is returned to the state before the suspended state using information stored in the DRAM 2213 at the time of the suspending processing.

When a user turns on the power switch, the CPU 2202 determines whether the image forming apparatus 1 is started up from the power-off state 301 or from the suspended state 305. If the image forming apparatus 1 is started up from the power-off state 301, then the CPU 2202 executes normal boot processing. If the image forming apparatus 1 is started up from the suspended state 305, then the CPU 2202 executes the resuming processing.

Figure 4:
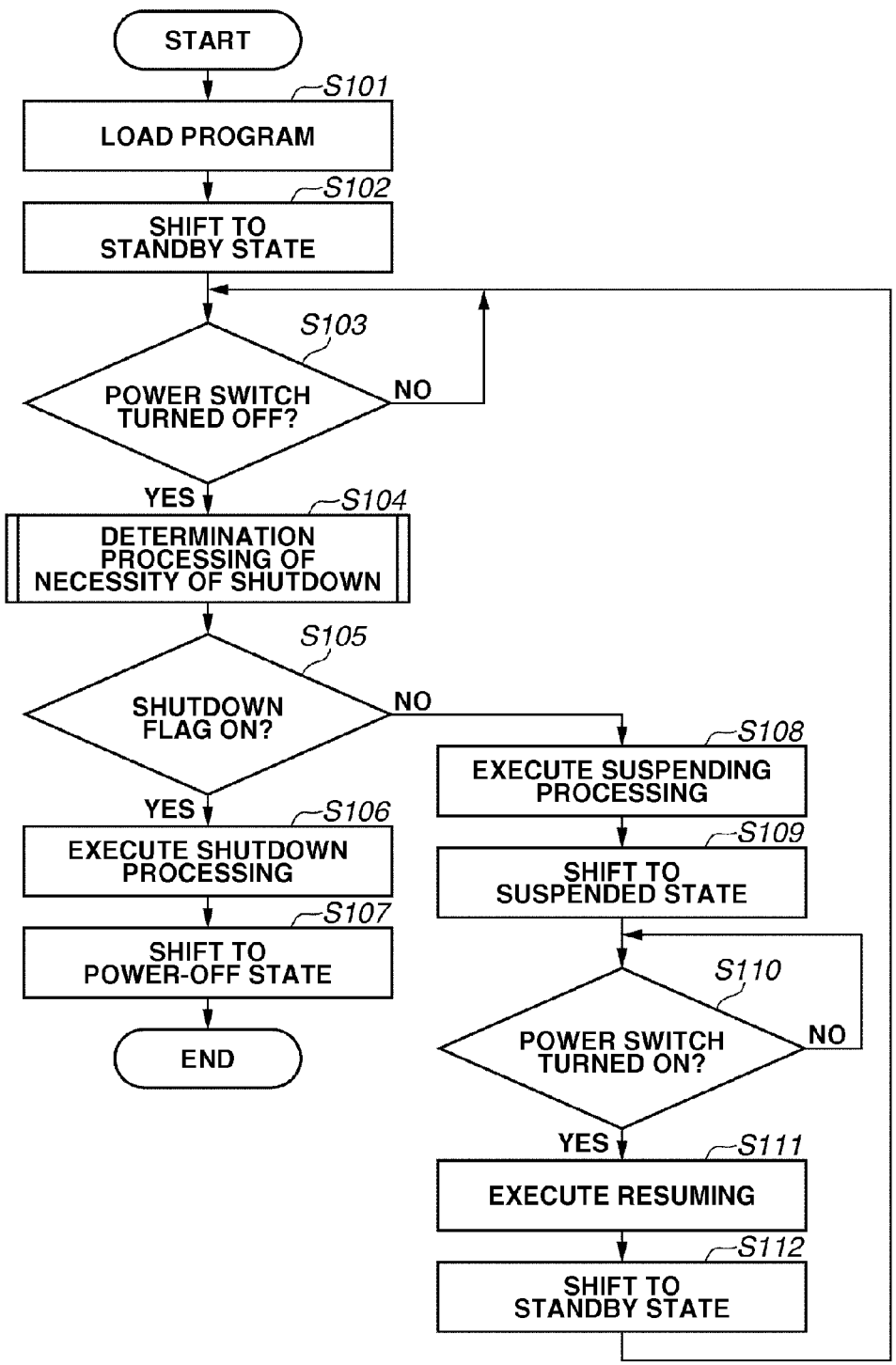
FIG. 4 is a flow chart illustrating operations performed in the image forming apparatus.

FIG. 4 is a flow chart illustrating operations performed in the image forming apparatus 1. The CPU 2202 reads a program stored in the hard disk 8 or in the flash disk 2208 into the DRAM 2213 to execute the program, whereby the operation is realized.

The processing illustrated in FIG. 4 is started when a user turns on the power switch in the power-off state 301.

In step S101, the CPU 2202 loads various programs such as the OS from the hard disk 8 into the DRAM 2213.

In step S102, the CPU 2202 shifts the image forming apparatus 1 to the standby state 302. The image forming apparatus 1 in the standby state 302 executes various jobs.

In step S103, the CPU 2202 determines whether the user has turned off the power switch. In a case where the user has turned off the power switch, an instruction to shift to the suspended state 305 is considered to have been received. If the user has turned off the power switch (YES in step S103), then the processing proceeds to step S104. Whereas if not, (NO in step S103), then the image forming apparatus 1 stands by until the CPU 2202 determines that the user has turned off the power switch (i.e., YES in step S103).

In step S104, the CPU 2202 executes determination processing of the necessity of a shutdown. The determination processing of the necessity of a shutdown will be described below. When the CPU 2202 executes determination processing of the necessity of a shutdown, information indicating that a shutdown flag is ON/OFF is stored in the DRAM 2213 as a result of the determination processing.

In step S105, the CPU 2202 checks the shutdown flag in the DRAM 2213 to determine whether the shutdown flag is ON. If the shutdown flag is ON (YES in step S103), then the processing proceeds to step S106. Whereas if not (NO in step S103), then the processing proceeds to step S108.

In step S106, the CPU 2202 executes shutdown processing of the image forming apparatus 1.

In step S107, the CPU 2202 shifts the image forming apparatus 1 to the power-off state 301.

In step S108, the CPU 2202 executes suspending processing of the image forming apparatus 1.

In step S109, the CPU 2202 shifts the image forming apparatus 1 to the suspended state 305.

In step S110, the CPU 2202 determines whether the user has turned on the power switch. More specifically, when the user turns on the power switch during the suspended state 305, the CPU 2202 receives an interrupt signal indicating that the power switch is turned on. Based on the interrupt signal, the CPU 2202 detects that the power switch is turned on. If the power switch is turned on (YES in step S110), then the processing proceeds to step S111. Whereas if not (NO in step S110), then the image forming apparatus 1 stands by until the CPU 2202 determines that the power switch is turned on (i.e., YES in step S110).

In step S111, the CPU 2202 executes resuming processing of the image forming apparatus 1.

In step S112, the CPU 2202 shifts the image forming apparatus 1 to the standby state 302.

In place of the processing in step S107 illustrated in FIG. 4, the CPU 2202 may reboot the image forming apparatus 1 and shift the image forming apparatus 1 to the standby state 302 or to the suspended state 305.

Figure 5:
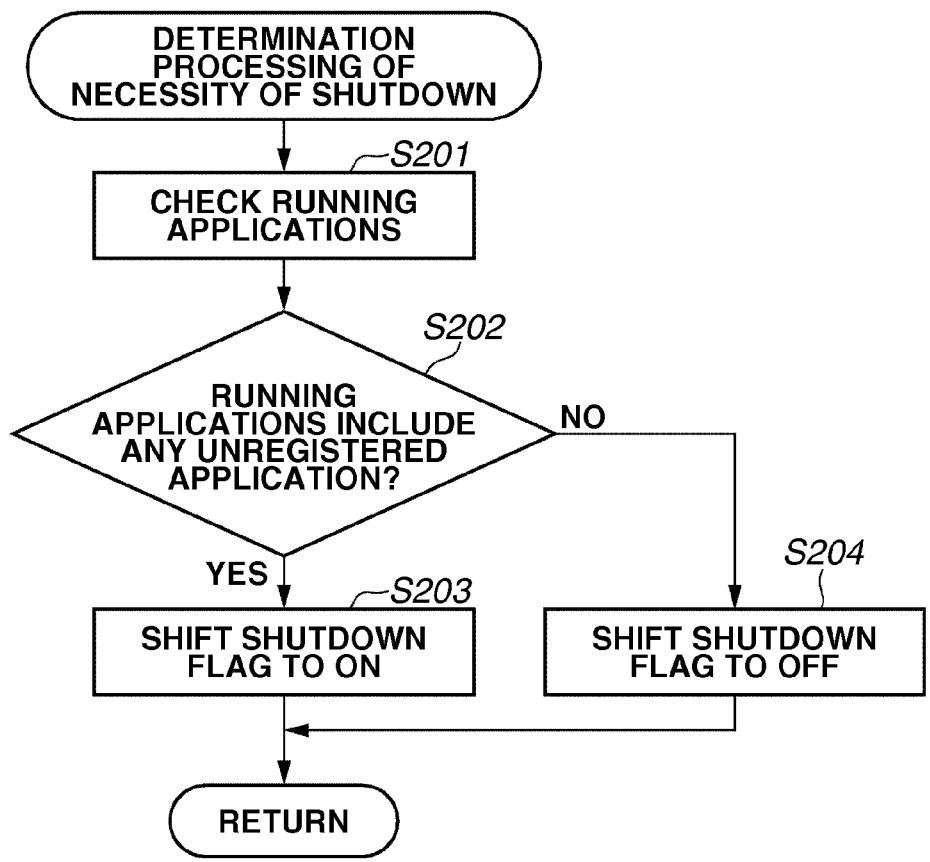
FIG. 5 is a flow chart illustrating determination processing of the necessity of a shutdown according to a first exemplary embodiment.

FIG. 5 is a flowchart illustrating the determination processing of the necessity of a shutdown according to the first exemplary embodiment. The CPU 2202 reads a program stored in the hard disk 8 or in the flash disk 2208 into the DRAM 2213 to execute the program, whereby the determination processing is realized.

In step S201, the CPU 2202 accesses the DRAM 2213 to check running applications.

In step S202, the CPU 2202 determines whether the running applications include any unregistered application. This processing is an example of determination of whether an application that does not support the suspending function is running. Examples of an application that does not support the suspending function include an application for execution of user authentication, an application for execution of communication, and an application for displaying an image on an image display apparatus. A list of applications that support the suspending function is registered in advance in the DRAM 2213 at the time of shipment from the factory and can be edited arbitrarily through updates of software and operations by a service engineer. The CPU 2202 determines that an application registered in the list is an application that supports the suspending function and that an application that is not registered in the list is an application that does not support the suspending function. If the CPU 2202 determined that the running applications include any unregistered application (YES in step S202), then the processing proceeds to step S203. Whereas if not (NO in step S202), then the processing proceeds to step S204.

In step S203, the CPU 2202 shifts the shutdown flag stored in the DRAM 2213 to ON.

In step S204, the CPU 2202 shifts the shutdown flag stored in the DRAM 2213 to OFF.

According to the first exemplary embodiment, malfunction can be prevented at the time of resuming an information processing apparatus when an instruction to shift to the suspended state is given while an unregistered application is running.

According to the first exemplary embodiment, the determination processing of the necessity of a shutdown is executed based on whether any unregistered application is running.

According to a second exemplary embodiment, on the other hand, the determination processing of the necessity of a shutdown is executed based on whether any application added by a user is running.

Except for the determination processing of the necessity of a shutdown, the second exemplary embodiment is the same as the first exemplary embodiment. Thus, description of the same portions of the second exemplary embodiment as the first exemplary embodiment is omitted.

Figure 6:
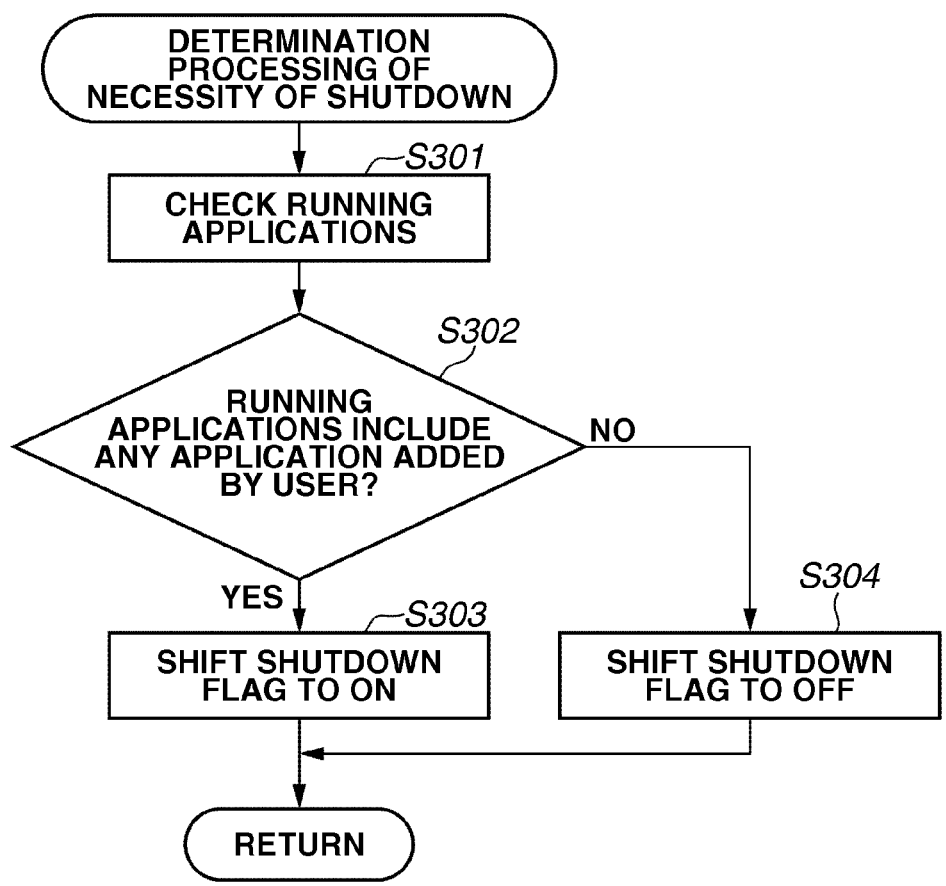
FIG. 6 is a flow chart illustrating determination processing of the necessity of a shutdown according to a second exemplary embodiment.

FIG. 6 is a flowchart illustrating the determination processing of the necessity of a shutdown according to the second exemplary embodiment. The CPU 2202 reads a program stored in the hard disk 8 or in the flash disk 2208 into the DRAM 2213 to execute the program, whereby the determination processing is realized.

In step S301, the CPU 2202 accesses the DRAM 2213 to check running applications.

In step S302, the CPU 2202 determines whether the running applications include any application added by a user. This processing is an example of determination of whether an application that does not support the suspending function is running. According to the second exemplary embodiment, a list of applications added by the user is registered in advance in the DRAM 2213, and information on the list is updated each time the user adds a new application. The CPU 2202 determines that an application that is registered in the list is an application that does not support the suspending function and that an application that is not registered in the list is an application that supports the suspending function. If the CPU 2202 determines that the running applications include any application added by the user (YES in step S302), then the processing proceeds to step S303. Whereas if not (NO in step S302), then the processing proceeds to step S304.

In step S303, the CPU 2202 shifts the shutdown flag stored in the DRAM 2213 to ON.

In step S304, the CPU 2202 shifts the shutdown flag stored in the DRAM 2213 to OFF.

According to the second exemplary embodiment, malfunction can be prevented at the time of resuming an information processing apparatus when an instruction to shift to the suspending state is given while an application added by a user is running.

According to the first exemplary embodiment, the determination processing of the necessity of a shutdown is executed based on whether any unregistered application is running.

According to a third exemplary embodiment, on the other hand, the determination processing of the necessity of a shutdown is executed based on whether any application that does not contain data indicating that the application supports the suspending function is running.

Except for the determination processing of the necessity of a shutdown, the third exemplary embodiment is the same as the first exemplary embodiment. Thus, description of the same portions of the third exemplary embodiment as the first exemplary embodiment is omitted.

The determination processing of the necessity of a shutdown is the same as that illustrated in FIG. 5, except for the processing in step S202. The processing in step S202 is replaced as follows.

In step S202, the CPU 2202 determines whether the running applications include an application that does not contain data indicating that the application supports the suspending function. This processing is an example of determination of whether an application that does not support the suspending function is running. Data indicating that an application supports the suspending function is included in advance in a program at the time of creating the program for the application and can be edited arbitrarily through updates of software and operations by a service engineer. The CPU 2202 determines that an application that contains the data is an application that supports the suspending function and that an application that does not contain the data is an application that does not support the suspending function. If the CPU determines that the running applications include an application that does not contain the data indicating that the application supports the suspending function (YES in step S202), then the processing proceeds to step S203. Whereas if not (NO in step S202), then the processing proceeds to step S204.

According to the third exemplary embodiment, malfunction can be prevented at the time of resuming an information processing apparatus when an instruction to shift to the suspending state is given while an application that does not contain the data indicating that the application supports the suspending function is running.

As described above, the suspending (or hibernation) and the shutdown are selected as appropriate without making a user who has performed an operation to turn off the power supply aware of it, so that appropriate initialization, high-speed booting, and excellent usability of an image forming apparatus are realized.

More specifically, the user does not need to recognize a difference between pausing processing (suspending or hibernation) and shutdown processing, and when the user performs a normal operation to turn off the power supply, the system automatically determines and operates the pausing processing or the shutdown processing as appropriate. Accordingly, appropriate initialization, high-speed booting, and excellent usability of an image forming apparatus can be realized.

It is obvious that the configurations and contents of various types of data pieces described above are not limited to those described above, and the various types of data pieces may have various configurations and contents according to the purpose of use.

Although the foregoing describes the exemplary embodiments, the present invention is also applicable to, for example, a system, an apparatus, a method, a program, and a storage medium. More specifically, the present invention is applicable to a system including a plurality of devices or an apparatus including a single device.

The scope of the present invention encompasses every combination of the above exemplary embodiments.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-122906 filed May 30, 2012, which is hereby incorporated by reference herein in its entirety.

What is claimed is:

1. An information processing apparatus comprising:
   a reception unit configured to receive a shift instruction to shift a power state of the information processing apparatus to a power saving state;
   a registration unit configured to register an application which supports the power saving state; and
   a control unit configured to shift the information processing apparatus to the power saving state in a case where an application different from the application registered by the registration unit is not running when the reception unit receives the shift instruction, and to turn off the information processing apparatus in a case where an application different from the application registered by the registration unit is running when the reception unit receives the shift instruction.

2. The information processing apparatus according to claim 1, wherein the control unit shuts down the information processing apparatus before the control unit turns off the information processing apparatus.

3. The information processing apparatus according to claim 1, wherein the control unit reboots the information processing apparatus after the control unit turns off the information processing apparatus.

4. The information processing apparatus according to claim 1, wherein the power saving state is a suspended state.

5. The information processing apparatus according to claim 1, wherein the power saving state is a hibernation state.

6. The information processing apparatus according to claim 1, further comprising an image forming unit configured to form an image on a sheet.

7. An information processing apparatus comprising:
   a reception unit configured to receive a shift instruction to shift a power state of the information processing apparatus to a power saving state;
   a registration unit configured to register an application added by a user and
   a control unit is-configured to shift the information processing apparatus to the power saving state in a case where an application corresponding to the application registered by the registration unit is not running when the reception unit receives the shift instruction, and to shut down the information processing apparatus in a case where an application corresponding to the application registered by the registration unit is running when the reception unit receives the shift instruction.

8. A method for controlling an information processing apparatus, the method comprising:
   registering an application which supports a power saving state;
   receiving a shift instruction to shift a power state of the information processing apparatus to the power saving state; and
   performing control to shift the information processing apparatus to the power saving state in a case where an application different from the registered application is not running when the shift instruction is received, and to turn off the information processing apparatus in a case where an application different from the registered application is running when the shift instruction is received.

9. A non-transitory computer-readable storage medium configured to store a program for causing a computer to execute the method for controlling the information processing apparatus according to claim 8.

* * * * *